June 16, 1953     D. WHITE     2,641,940
SPECIAL BORING BAR
Filed Aug. 9, 1949
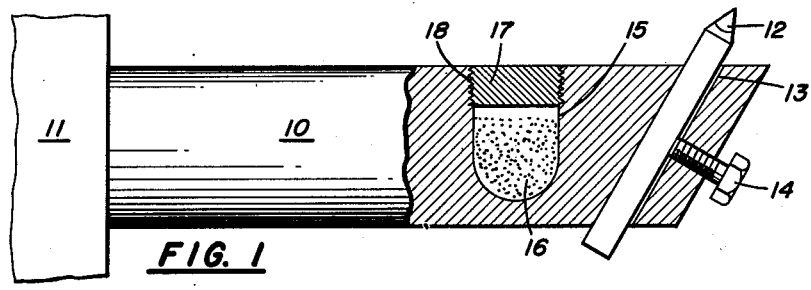
FIG. 1
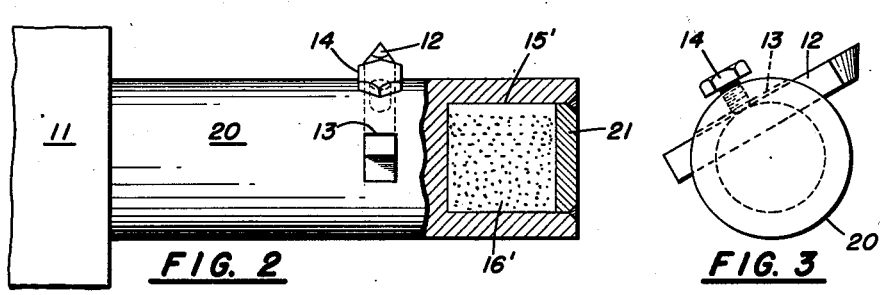 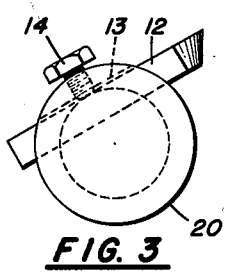
FIG. 2     FIG. 3
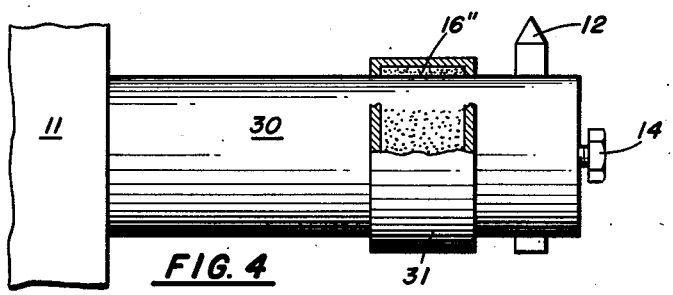
FIG. 4
Inventor
DAN WHITE
By 
Attorney Patented June 16, 1953

2,641,940

UNITED STATES PATENT OFFICE 2,641,940

SPECIAL BORING BAR

Dan White, Cleveland, Ohio

Application August 9, 1949, Serial No. 109,383

3 Claims. (Cl. 77—58)

(Granted under Title 35, U. S. Code (1952), sec. 266)

This invention relates generally to boring bars and specifically to a boring bar for cutting deep holes in metal at high speeds.

At present it is impossible to accurately bore deep holes in hard metals with a boring bar due to the chatter of the tool in the cavity and the resultant rough surfaces and errors in the diameter of the bore with possible breakage of the boring bar. It is usually necessary to finish the internal surface of the bore after using a conventional boring bar at high speeds by reaming or otherwise treating said surface to remove chatter marks. Slow speeds of feed and rotation are generally necessary to prevent chatter in boring deep holes or cavities in most metals.

An object of the present invention is to provide a boring bar of such construction that will permit it to be used without chattering at speeds greater than is possible with present tools.

Another object of the invention is to provide a boring bar which can be used at any lathe speeds without chattering and consequent roughening of the surface cut.

Another object is to provide a boring bar having an external shape and size of no greater dimensions or configuration than present tools in order that no parts of the tool offer impedance to cutting internal faces and surfaces in metal.

A further object is to provide a tool which will not chatter while used to cut metals of such composition or hardness that present day tools cannot cut without chatter.

Other objects and features of the invention will become apparent to those skilled in the art as the disclosure is made in the following detailed description of a preferred embodiment of the invention as illustrated in the accompanying sheet of drawing in which:

Fig. 1 is a top view partially in section of one embodiment of the invention.

Fig. 2 is a top view partly in section of another embodiment of the invention.

Fig. 3 is an end view of the embodiment shown in Fig. 2.

Fig. 4 is a top view partly in section of still another embodiment of the invention.

Referring in more particular to the drawing, in Fig. 1 is shown a boring bar 10 secured at one end in a tool holder 11 such as is used on a lathe, boring machine or the like. A cutting tool bit 12 is secured in opening 13 in the boring bar 10 by set screw 14 in the conventional manner. Adjacent the end of the boring bar 10 which holds the cutting tool bit 12 is cavity 15 formed or drilled therein and filling the cavity 15 is a powdered material 16 of a composition to be described later. The cavity 15 is closed by a threaded plug 17 engaging the internal threads 18 of the entrance to the cavity 15.

In Fig. 2 another embodiment of the invention is shown with the cavity 15' drilled in the end of the boring bar 20 and filled with powdered material 16'. The cavity 15' is in this embodiment closed by plug 21 welded to the boring bar.

In Fig. 3 the end of the boring bar 20 of Fig. 2 is shown in end view. Fig. 4 shows still another embodiment of a boring bar 30 having around it near the cutting tool bit 12 an annular collar 31 formed so as to enclose an amount of loose material 16''. The collar 31 may be secured to the boring bar 30 by a press fit or by welding, or in any other conventional manner.

Experiments have shown that the cavity 15, or 15' or the space in the annular collar 31 may be filled to approximately 90% of capacity with a powder made of tungsten, or of tungsten carbide, and that satisfactory results of no appreciable chatter may be thusly obtained. Other substances may be used without departing from the scope and breath of the invention. Certain no-chatter characteristics may be imparted to a tool by the use of liquid mercury in the cavity for some uses, and the cavity may be filled to other limits of capacity than the 90%. Likewise, the invention may be applied to other cutting tools and may be used on lathe tools generally and on cut-off tools used on metals which normally present a problem of chatter and spoilage of the finished surface of the metal.

Additional energy absorption means may be applied to the boring bar to increase further its effectiveness as a cutting tool. A relatively thick strip of copper may be inserted in the tool bit opening 13 and partially or completely encircle the bit 12, and thus cushion it against the bar 10. For example, a ⅛-inch thick strip having approximately the width of the tool bit 12 and placed under it in the opening 13 prevented chattering of the tool.

As a still further aid in reducing the chatter of the tool, the bar 10 may be coated by any suitable means, such as by electrode position or dipping or a combination of both, with a layer of copper and lead, and all or part of the bar may be so coated. For example, the entire bar may be coated with a .002-inch layer of copper, and that portion of the copper layer on the bar 10 from the end holding the tool bit 12 to the center of the bar may be covered with a .004-inch layer of lead.

Furthermore, the boring bar 10 may be made from material having high inherent damping properties. From tests, it has been determined that hardened tool steel boring bars will chatter the most whereas a perlitic cast iron boring bar will chatter the least.

The foregoing relates only to preferred embodiments of the invention and numerous modifications may be made therein without departing from the spirit and scope of the invention as set forth in the appended claims.

The invention described herein may be manufactured and used by or for the Government of the United States of America for governmental purposes without the payment of any royalties thereon or therefor.

What is claimed is:

1. A tool for metal working comprising a body, a bore in said body, the axis of said bore being perpendicular to a plane through the center line of the body, a single point cutting tool subject to torsional vibration extending laterally beyond the surface of the body on one side of the aforesaid plane, at least one half of said bore being on the opposite side of said plane, and a freely movable, non-packing, high density powdered substance partially filling said bore so as to permit the movement of more than half of the powdered substance into the above mentioned half of said bore when the tool is rotated.

2. A tool as set forth in claim 1 wherein the powdered substance is composed of tungsten.

3. A tool as set forth in claim 1 wherein the powdered substance is composed of tungsten carbide.

DAN WHITE.

References Cited in the file of this patent

UNITED STATES PATENTS

| Number | Name | Date |
|---|---|---|
| 2,051,954 | Leland | Aug. 25, 1936 |
| 2,224,386 | Guild | Dec. 10, 1940 |
| 2,375,818 | Peters | May 15, 1945 |
| 2,469,167 | Little | May 3, 1949 |